United States Patent [19]

Caillat et al.

[11] Patent Number: 4,954,057
[45] Date of Patent: Sep. 4, 1990

[54] SCROLL COMPRESSOR WITH LUBRICATED FLAT DRIVING SURFACE

[75] Inventors: Jean-Luc Caillat, Dayton; Stephen M. Seibel, Sidney, both of Ohio

[73] Assignee: Copeland Corporation, Sidney, Ohio

[21] Appl. No.: 259,252

[22] Filed: Oct. 18, 1988

[51] Int. Cl.5 .............. F04C 18/04; F04C 29/02; F16C 32/06; F16C 33/10
[52] U.S. Cl. ........................... 418/55.6; 418/88; 384/12; 384/114
[58] Field of Search ........... 418/55 E, 88, 94; 384/12, 99, 114, 119; 184/6.18, 31

[56] References Cited

U.S. PATENT DOCUMENTS

| | | | |
|---|---|---|---|
| 4,320,926 | 3/1982 | Heinemann et al. | 384/12 |
| 4,462,772 | 7/1984 | Hazaki et al. | 418/55 E |
| 4,609,334 | 9/1986 | Muir et al. | 418/55 E |
| 4,623,306 | 11/1986 | Nakamura et al. | 418/55 E |
| 4,637,786 | 1/1987 | Matoba et al. | 418/55 E |
| 4,717,263 | 1/1988 | Phillips | 384/12 |

Primary Examiner—John J. Vrablik
Attorney, Agent, or Firm—Harness, Dickey & Pierce

[57] ABSTRACT

A scroll machine having an eccentric crank pin on a crankshaft disposed nonrotatably in the bore of a drive bushing for driving the orbiting scroll of the compressor. A flat surface on the crank pin drivingly engages a flat surface in the bore, and a unique lubrication arrangement incorporating a hydrostatic bearing is provided to lubricate the flat surfaces. Several alternative embodiments are also disclosed.

36 Claims, 4 Drawing Sheets

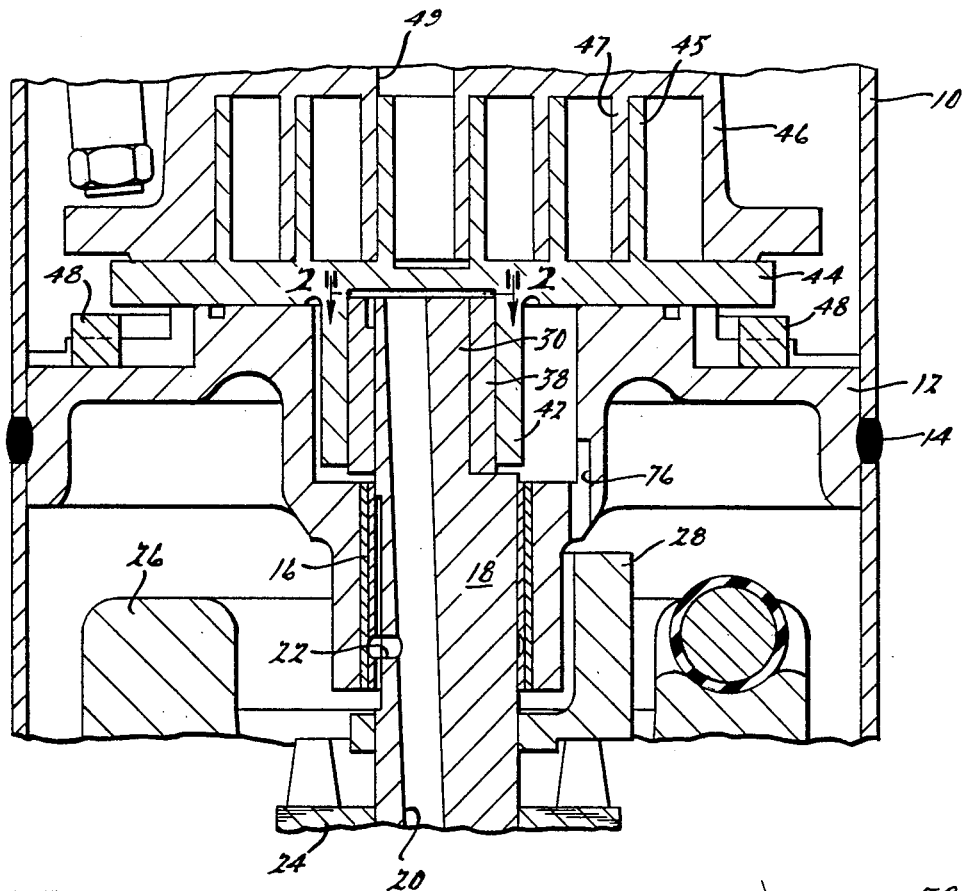
FIG. 1.
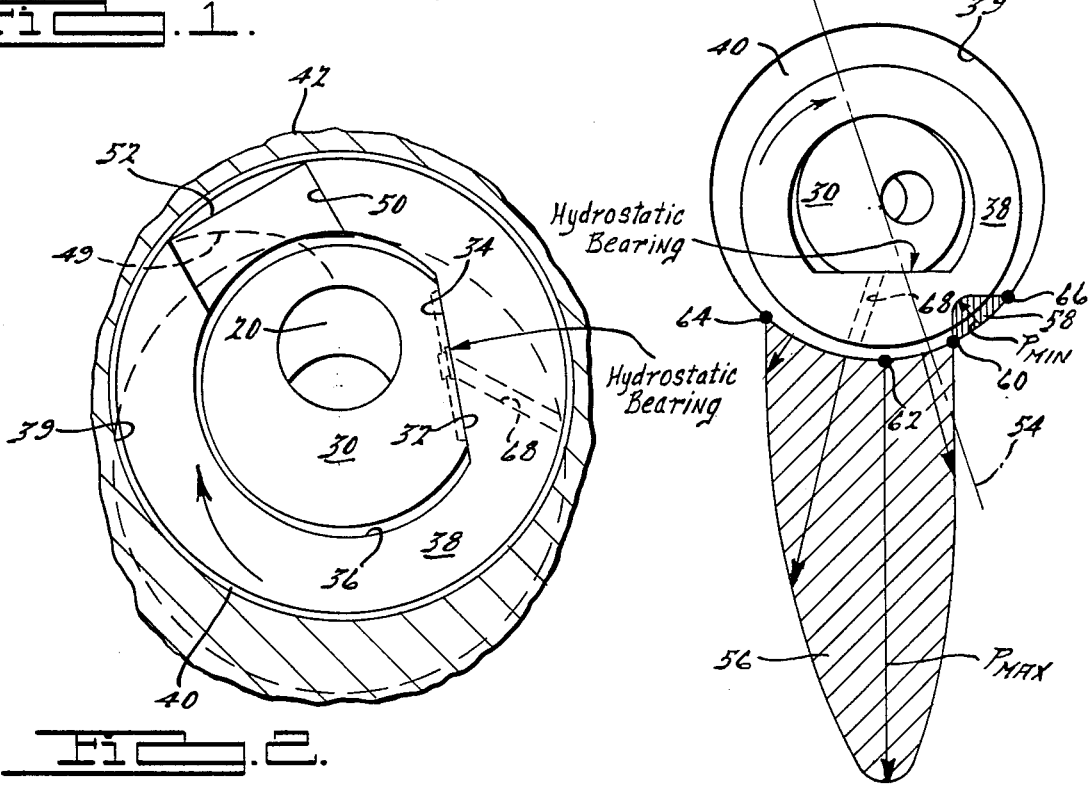
FIG. 2.
FIG. 3.

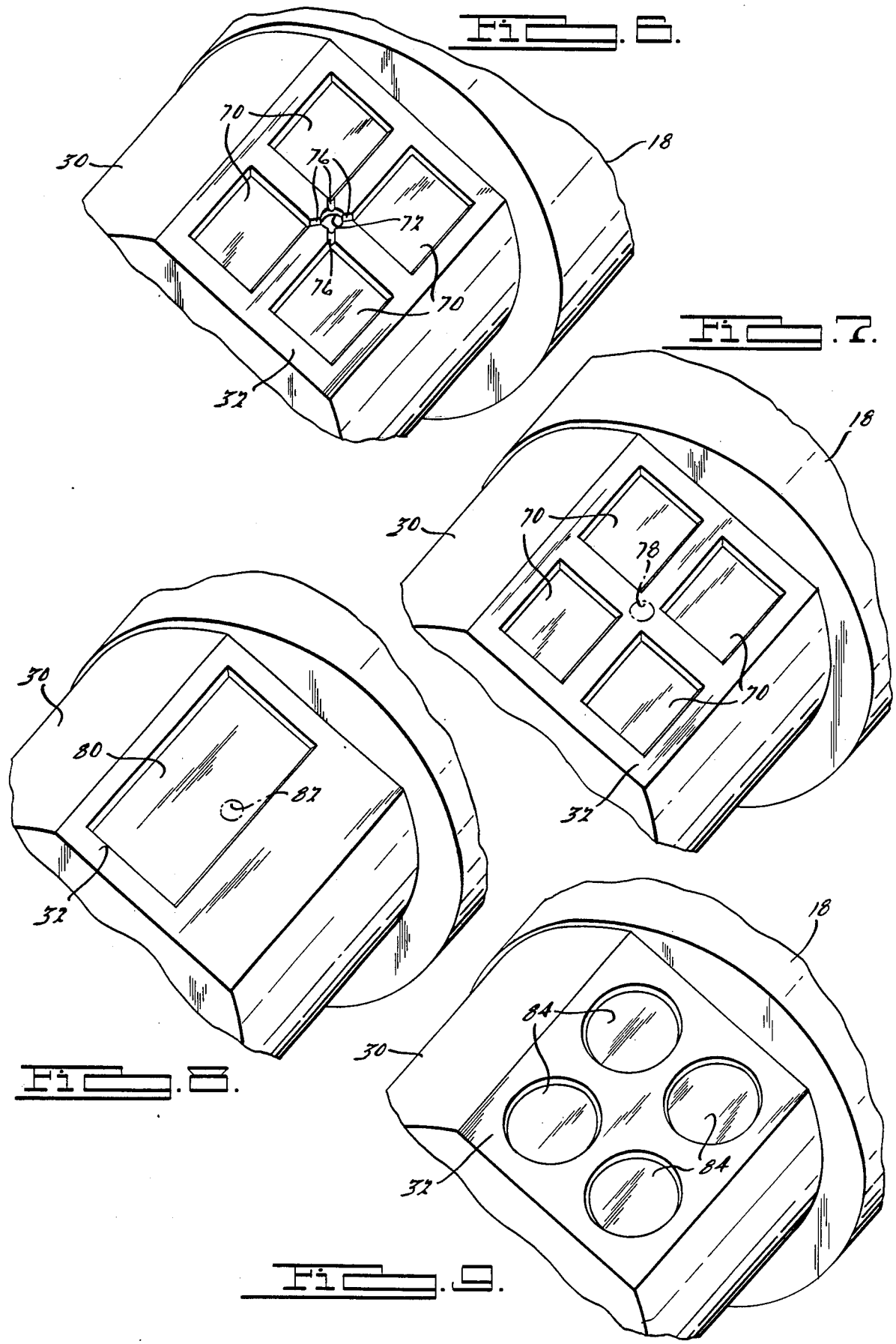

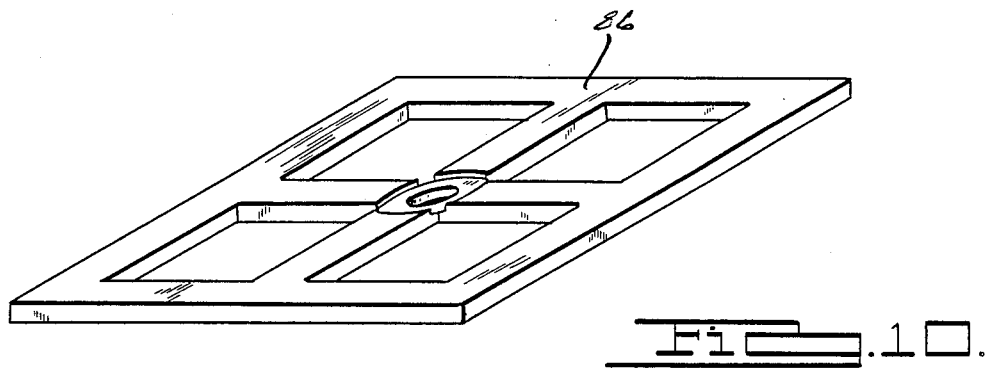
FIG. 10.
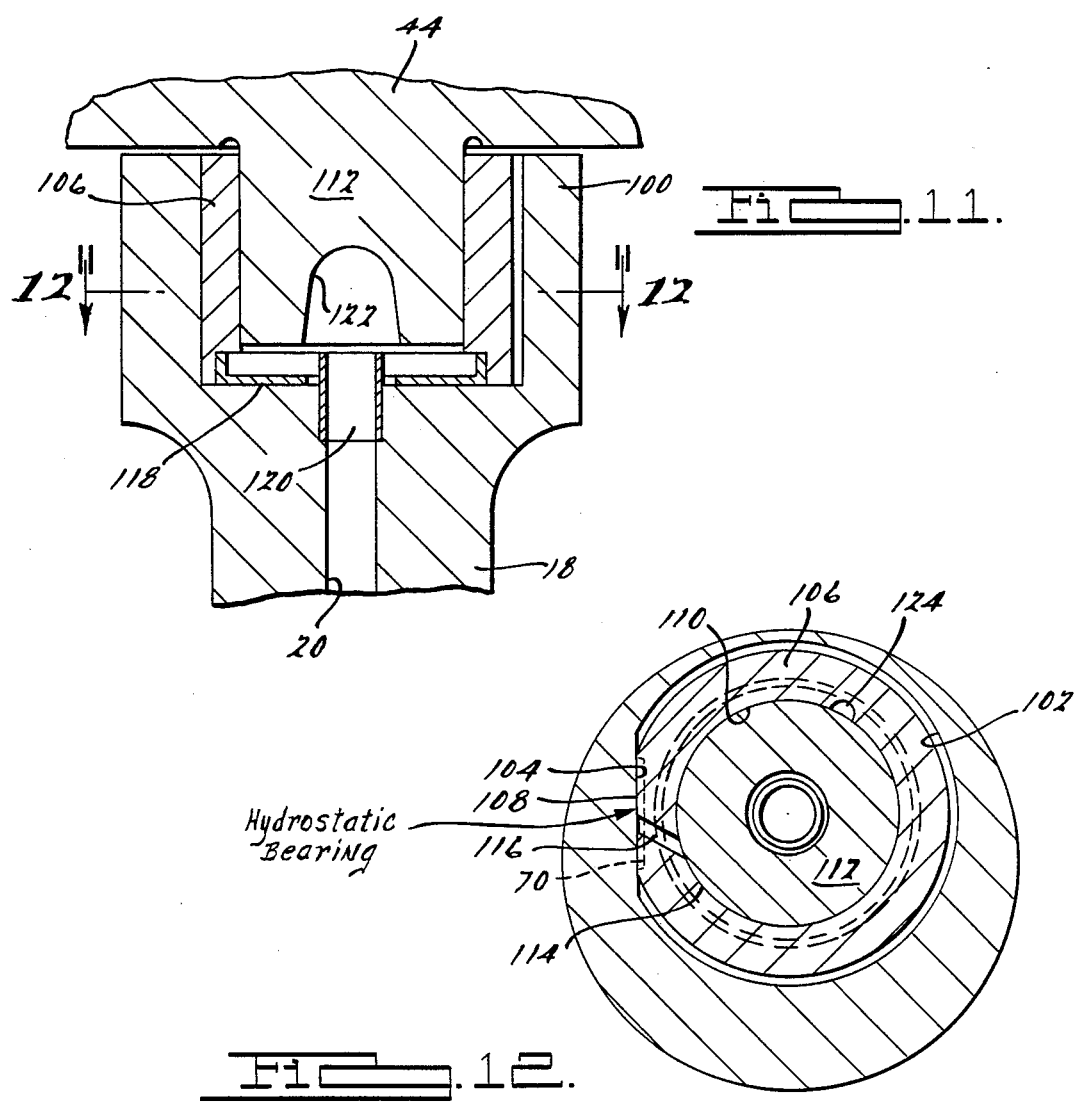
FIG. 11.
Hydrostatic Bearing
FIG. 12.

1

SCROLL COMPRESSOR WITH LUBRICATED FLAT DRIVING SURFACE

This invention relates to scroll machines, and more particularly to a radially compliant orbiting scroll drive arrangement having improved lubrication.

A common type scroll compressor comprises non-orbiting and orbiting scroll members having interfitting spiral vanes, the flanks of the vane on one member being in sealing contact with the flanks of the vane on the other member. The vanes define moving fluid-containing pockets which change in volume as one scroll member orbits with respect to the other scroll member.

Orbital movement is generally provided by an elongated axial crankshaft journaled adjacent its opposite ends for rotation in respective bearings of the compressor. One end commonly has an eccentric crank pin disposed in a drive bearing mounted in a hub on the orbiting scroll member, whereby rotation of the crank causes of orbiting scroll member to orbit with respect to the non-orbiting scroll member. In a radially compliant drive an unloader bushing may be provided between the crank pin and hub bearing, the crank pin having a flat surface drivingly engaging a flat surface on the bushing so that limited sliding can occur to unload the machine. As loading increases, due to compressed gas forces, the forces on the flat driving surfaces can become so high that it becomes difficult to provide adequate lubrication to insure proper radial unloading and the avoidance of damaging wear.

It is therefore a primary object of the present invention to provide such a drive arrangement having means for lubrication which obviates the aforesaid problems which can occur under high load conditions, thereby increasing unloader reliability and overall performance.

Other advantages and features will become apparent from the following specification taken in connection with the accompanying drawings.

BRIEF DESCRIPTION OF THE DRAWINGS

FIG. 1 is a partial vertical cross-sectional view of a scroll compressor embodying the principles of the present invention;

FIG. 2 is an enlarged fragmentary cross-sectional view taken along line 2—2 in FIG. 1;

FIG. 3 is a diagrammatic showing of the oil pressure curve for the hydrodynamic journal bearing shown in FIG. 2, with a rotating load;

FIGS. 6, 7, 8 and 9 are views similar to FIG. 4 illustrating alternative embodiments of the present invention;

FIG. 10 is a perspective view of yet another embodiment of the present invention;

FIG. 11 is an enlarged fragmentary view of a different type of orbiting scroll drive embodying the principles of the present inventions; and FIG. 12 is a cross-sectional view taken along line 12—12 in FIG. 11.

DESCRIPTION OF THE PREFERRED EMBODIMENTS

Figure 4:
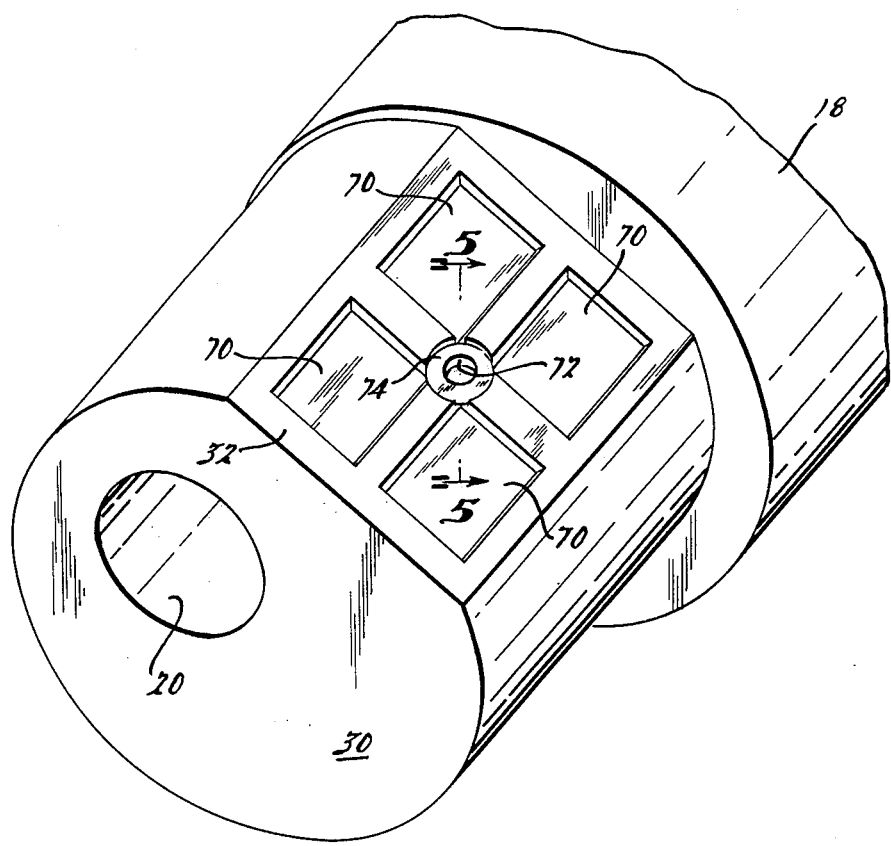
FIG. 4 is an enlarged perspective view of the crank pin of the preferred embodiment of FIG. 1.

Although the orbiting scroll drive assembly of the present invention is applicable to different types of scroll machinery, it is illustrated for exemplary purposes embodied in a scroll compressor, and in particular a hermetic refrigerant compressor. The essential components of the machine are illustrated in FIG. 1, wherein there is shown a hermetic shell 10, a main bearing housing 12 welded to shell 10 by a plurality of welds 14, a bearing assembly 16 carried by housing 12 and having journaled therein a crankshaft 18 having a slightly inclined upwardly axially extending oil feed passageway 20 open at the upper end of the crankshaft and a radial oil feed passageway 22 for feeding lubricant to bearing 16. Crankshaft 18 is affixed at its lower portion to a motor rotor 24 which is energized by the usual motor stator, the upper windings 26 of which are seen in FIG. 1. A counterweight 28 may be affixed to the crankshaft above the rotor. The bottom of the crankshaft (not shown) can also be journaled in a bearing in the usual manner if desired.

The upper end of crankshaft 18 comprises an eccentric crank pin 30 having on one face thereof a generally flat driving surface 32 which drivingly engages a flat driven surface 34 disposed on the wall of a bore 36 in an unloader drive bushing 38 rotatably journaled within a bore 39 disposed in a hub 42 affixed to an orbiting scroll member 44 having a spiral wrap 45. The outer surface of hub 38 and bore 39 define a conventional journal bearing 40. Meshing with orbiting scroll member 44 in the usual manner is a non-orbiting scroll member 46 having a spiral wrap 47 and a discharge passage 49. Relative rotational movement between the orbiting and non-orbiting scroll members is prevented by means of a Oldham coupling 48 disposed between orbiting scroll member 44 and bearing housing 12.

The orbiting drive mechanism is lubricated by means of a conventional oil pump located at the lower end of the crankshaft (not shown) in the usual oil sump (not shown) disposed in the bottom of the hermetic shell. Oil is pumped by that pump up passageway 20 to all the points requiring lubrication, with excess oil being pumped out of the upper open end of passage 20 generally along path 49 across the upper end of crank pin 30 and drive bushing 38 into a recess or slot 50 disposed in the upper surface of the latter, which in turn communicates with a flat 52 on the external surface of bushing 38 which defines a passageway for oil to be transmitted to journal 40. Flat 52 is on an unloaded portion of journal bearing 40. As described up to this point, the compressor (including the portions not shown) are identical to that described in assignee's copending patent application Ser. No. 899,003, filed Aug. 22, 1986, U.S. Pat. No. 4,767,293, the disclosure of which is incorporated herein by reference.

As discussed in greater detail in the aforementioned patent, the rotational driving force of crank pin 30 is transmitted to drive bushing 38 by virtue of the interengagement of flat surfaces 32 and 34. As can be seen, the parts are configured so that relative sliding movement between crank pin 30 and bushing 38 is possible (in a direction transverse to the primary load force) in order to accommodate separation of the flanks of the scroll wraps when solid or liquid material is ingested into the compressor. Bushing 38 thus provides both a drive and an unloading function with the sliding taking place between surfaces 32 and 34. Because of the relatively high unit loads on these surfaces, it is very important that adequate lubrication be provided. In this regard, applicant has devised a unique hydrostatic bearing concept to provide this lubrication. One of the unusual features of this invention is that the high pressure lubricating oil required to make the hydrostatic bearing function is supplied not from a separate lubricating pump as such but from the high pressure oil film portion of hydrodynamic journal bearing 40, which itself actually functions as a pump as it circulates oil around the journal.

FIG. 3 illustrates, using exaggerated journal clearances, a typical oil film pressure curve for a conventional hydrodynamic journal bearing having a rotating load. Bushing 38 rotates in a clockwise direction in journal 40 and because of the driving loads imposed by crank pin 30, and the bearing is loaded in a generally downwardly direction as shown, whereby the oil film is squeezed to a minimum thickness along an axis 54, where there is minimum clearance between bushing 38 and bore 39, which results in a point of maximum clearance 180° around the journal. As bushing 38 rotates in journal bearing 40 in a clockwise direction it causes the lubricating oil supplied to the journal bearing to flow in a counter-clockwise direction through the clearance space of the bearing relative to the point of maximum load. Shaded area 56 indicates the distribution of positive oil film pressure and shaded area 58 indicates the distribution of negative oil film pressure. The oil film pressure starts to increase from essentially ambient at point 64 until it reaches its maximum at point 62 after which it decreases back to essentially ambient at point 60 from which it drops briefly below ambient before going back to ambient at point 66. The journal bearing 40 thus operates as a pump for pumping lubricating oil from a low pressure to a much higher pressure, with the maximum pressure point indicated at 62. It is this high pressure oil which is used in the present invention to supply lubricant to the hydrostatic bearing disposed between flat surfaces 32 and 34.

The passageway for feeding high pressure oil from journal bearing 40 to the hydrostatic bearing is indicated at 68. As best seen in FIG. 3, the inlet to passageway 68 is located just slightly ahead of the point of maximum oil film pressure. This position is chosen because of the need to insure that there is adequate pressure to feed the hydrostatic bearing but also to avoid the possibility of starving the hydrodynamic bearing by removing oil at the maximum pressure point. Passageway 68 is not located downstream of maximum pressure because of the extremely rapid fall-off of pressure which could result in oil starvation to the hydrostatic bearing in the event of a slight misalignment of parts in production.

Figure 5:
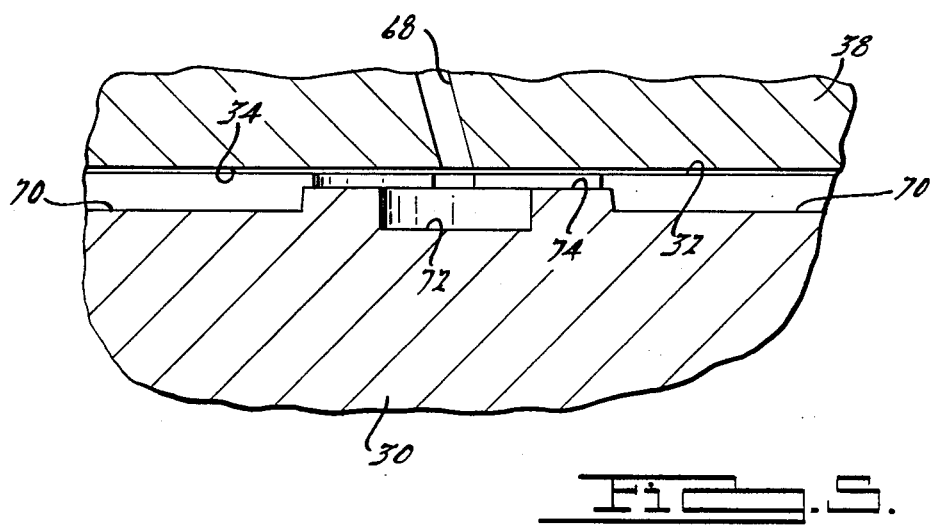
FIG. 5 is an enlarged fragmentary cross-sectional view taken along line 5—5 in FIG. 4 but also showing the mating driven surface.

It is believed that the hydrostatic bearing will function adequately utilizing a perfectly flat surface of 32 on crankpin 30. However, there is illustrated in FIGS. 4 and 5 a preferred embodiment of the hydrostatic bearing wherein surface 32 is especially configured to enhance the bearing function. In this embodiment surface 32 is provided with 4 generally equally shaped, equally distributed relatively shallow recesses 70 and a centrally disposed oil reservoir 72. Oil reservoir 72 is put into restricted fluid communication with recesses 70 by means of a shallow, centrally disposed recess 74. Passageway 68 is normally generally aligned with reservoir 72 and the relatively high pressure oil supplied thereby (as much as several thousand psi) is pumped directly into reservoir 72 from which is maintains recesses 70 supplied with sufficient oil at all times to maintain the necessary separation of parts inherent in the operation of a hydrostatic bearing. The greater the oil pressure the greater the separating force, but as the clearance between the flat bearing surfaces increases the greater is the area exposed, which reduces unit pressure until the bearing assumes a stable point of operation. The use of multiple recesses 70 covering a majority of the extent of surface 32 is believed to provide stability to the bearing. Excess oil will drain out of the bottom of the bearing interface into the well in bearing housing 12 above bearing assembly 16, from which it will drain back to the sump via a drain passageway 76 (FIG. 1). Because they can be very shallow, recesses 70 and 74 can be simply coined into the surface 32, or if desired, they can be machined.

In FIGS. 6 through 10, there are illustrated several alternative embodiments of the hydrostatic bearing of the present invention. The arrangement in FIG. 6 is identical to that in FIG. 4 except that instead of having a shallow recess 74 for providing a restricted flow of oil to recesses 70 there are provided four small oil feed passageways 76. The arrangement of FIG. 7 is similar to that of FIG. 4 except that reservoir 72 and recess 74 are eliminated. Phantom circle 78 indicates where the high pressure oil is delivered to the bearing interface by passageway 68. In this embodiment, the oil is fed to recesses 70 through the clearance space defining the bearing. The embodiment of FIG. 8 is somewhat similar except that there is provided only a single recess 80 covering slightly more than half of surface 32 (the more highly loaded portion) and positioned in such a way as to overlap the delivery point of high pressure oil from passageway 68, indicated by phantom circle 82. The embodiment of FIG. 9 is identical to that of 7 except that the four spaced recesses, indicated at 84, are circular rather than rectangular as in the previous embodiments. In all of these embodiments the treatment of the flat driving and driven surfaces can be reversed, with the recesses (but no separate reservoir) disposed on the bushing rather than the crank pin, or recesses can be provided on both flat surfaces. Also, the recesses can be of other configurations, and need not be symmetrical.

The embodiment of FIG. 10 is identical in function and overall configuration as the preferred embodiment shown in FIG. 4, with the exception that rather than forming the recesses and reservoir in surface 32 on the crank pin, there is alternatively provided a shim 86 having an overall configuration corresponding to surface 32 and having either coined therein or punched therethrough the corresponding reservoir and recesses. Shim 86 is merely inserted between surfaces 32 and 34 (a suitable clearance being provided) during assembly of the machine. It will thereafter function exactly the same as the embodiment shown in FIG. 4.

The principles of the present invention are also applicable to a scroll machine in which the orbiting scroll drive is reversed from that shown in FIG. 1, i.e., the driven element is in the center of the assembly and the driving element is external thereof. In this embodiment, as best seen in FIGS. 11 and 12, the upper end of crankshaft 18 is provided with an enlarged hub 100 having an axial bore 102 therein, one portion of which is formed with a generally flat driving surface 104. Disposed within bore 102 is an unloader drive bushing 106 having a flat driven surface 108 drivingly engaging driving surface 104. As in the previous embodiment, relative sliding movement between these two flat surfaces is possible to provide radial compliance in the machine. The center of bushing 106 is provided with an axially extending cylindrical bore 110 in which is journalled a cylindrical drive pin 112 extending downwardly from the lower surface of orbiting scroll 44. The outer surface of drive pin 112 and bore 110 define a hydrodynamic journal bearing 114 which is the same as journal bearing 40 in the first embodiment. As before, oil is taken from journal bearing 114 at a point just prior to its maximum film pressure and supplied via a passageway 116 to the central area of the hydrostatic bearing defined by surfaces 104 and 108.

Oil is supplied to the drive assembly of this embodiment via main oil supply passage 20 which pumps oil into a reservoir defined by a cup element 118 press fit in the lower end of bushing 106 below and spaced from the end of drive pin 112. A short extension tube 120 press fit into the end of passageway 20 and a recess 122 in the lower end of drive pin 112 may be provided to assure that there is an adequate flow of oil to the drive assembly. Oil is supplied from the small temporary reservoir defined by cup element 118 to the hydrodynamic journal bearing 114 by means of an oil supply groove 124 provided in the surface of bore 102 on an unloaded portion of the journal bearing. As can be appreciated, the orbiting scroll drive lubrication arrangement of FIGS. 11 and 12 functions in exactly the same manner as the preferred embodiment disclosed in FIG. 1 through 5, and surfaces 104 and 108 can be configured as in the previously described embodiments.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. In a machine having two bearings, wherein one is a hydrodynamic bearing and the other is a hydrostatic bearing, the improvement comprising: first means for supplying lubricating oil from a source thereof to said hydrodynamic bearing; and an oil passage for supplying lubricating oil under pessure generated by said hydrodynamic bearing to said hydrostatic bearing to lubricate same, said passage communicating with said hydrodynamic bearing at a point where only relatively high pressures are developed by said hydrodynamic bearing.

2. A machine as claimed in claim 1 wherein the loading of said journal bearing is such that it has an area of positive oil film pressure, said oil passage communicating with said journal bearing in the area of said positive oil film pressure.

3. A machine as claimed in claim 2 wherein said oil passage communicates with said journal bearing in the area of said positive oil film pressure adjacent to but spaced from the point of maximum pressure.

4. A machine as claimed in claim 2 wherein said oil passage communicates with said journal bearing at a point prior to the point of maximum pressure.

5. A machine as claimed in claim 1 wherein said hydrostatic bearing is disposed between two generally flat surfaces which slide relative to one another.

6. A machine as claimed in claim 1 wherein the plane of said hydrostatic bearing is parallel to the axis of said hydrodynamic bearing.

7. A machine as claimed in claim 1 wherein said hydrostatic bearing is spaced from said hydrodynamic bearing in a non-intersecting relationship.

8. A machine as claimed in claim 1 wherein said oil passage receives oil from said hydrodynamic bearing only at pressures near the maximum pressure generated by said hydrodynamic bearing.

9. A scroll machine comprising:
 (a) a first scroll member and a second scroll member mounted for orbital movement with respect to one another in an intermeshed relationship;
 (b) powered drive means having a generally flat driving surface for causeing said relative orbital movement;
 (c) a generally flat driven surface operatively connected to one of said scroll members, said driving surface driving said driven surface to cause said one scroll member to orbit with respect to the other of said scroll members, said driving engagement including limited transverse movement between said surfaces;
 (d) a hydrodynamic journal bearing operatively disposed between said drive means and said one scroll member; and
 (e) hydrostatic bearing means for lubricating the interface between said driving and driven surfaces to minimize sliding friction therebetween, comprising means defining a recess on one of said surfaces, and oil supply means for delivering lubricating oil under pressure to a location disposed at said interface between said surfaces, said location being in fluid communication with said recess, said oil supply means receiving oil from the high oil film pressure portion of said journal bearing.

10. A scroll machine as claimed in claim 9 further comprising means defining a path of restricted flow between said location and said recess.

11. A scroll machine as claimed in claim 9 comprising a plurality of said recesses.

12. A scroll machine as claimed in claim 11 wherein said recesses are rectangular in configuration.

13. A scroll machine as claimed in claim 11 wherein said recesses are circular in configuration.

14. A scroll machine as claimed in claim 11 wherein said recesses are on said driving surface.

15. A scroll machine as claimed in claim 11 wherein said recesses are on said driven surface.

16. A scroll machine as claimed in claim 11 wherein oil is supplied to said interface through the other of said surfaces.

17. A scroll machine as claimed in claim 11, further comprising a cavity in said one surface defining an oil reservoir in fluid communication with said location.

18. A scroll machine as claimed in claim 17, further comprising oil passage means placing said reservoir in restricted fluid communication with said recesses.

19. A scroll machine as claimed in claim 18 wherein said passage means comprises a slight indentation in said one surface surrounding said reservoir and intersecting each of said recesses.

20. A scroll machine as claimed in claim 18 wherein said passage means comprises discrete grooves in said one surface interconnecting said reservoir and each of said recesses.

21. A scroll machine as claimed in claim 9 comprising a single recess covering slightly more than one-half of said one surface.

22. A scroll machine as claimed in claim 21 wherein said recess is disposed on the more heavily loaded portion of said hydrostatic bearing means.

23. A scroll machine as claimed in claim 22 wherein said recess is generally rectangular in configuration.

24. A scroll machine as claimed in claim 9 further comprising a shim disposed between said generally flat surfaces, said recess being disposed in said shim.

25. A scroll machine as claimed in claim 9 wherein said oil supply means comprises a passage communicating with said journal bearing at a point near but spaced from the area of maximum oil film pressure therein.

26. A scroll machine as claimed in claim 25 wherein said point is disposed prior to said area of maximum oil film pressure.

27. A scroll machine comprising:
   (a) a first scroll member;
   (b) a second scroll member mounted for orbital movement with respect to said first scroll member, said second scroll member having a driven portion, said scroll members having spiral wraps in an intermeshed relationship;
   (c) a rotatable powered drive shaft having a driving portion, said driving and driven portions being arranged with one disposed within the other;
   (d) a generally annular drive bushing disposed between and drivingly interconnecting said driving and driven portions, said drive bushing being connected to one of said portions by means of a hydrodynamic journal bearing and to the other of said portions by means of a flat surface on said bushing drivingly engaging a flat surface on said other portion, said driving engagement including limited sliding movement between said flat surfaces to permit radially compliant engagement of said scroll wraps;
   (e) lubrication means for supplying oil to said bearing journal;
   (f) hydrostatic bearing means for lubricating the interface between said flat surfaces to minimize sliding friction therebetween; and
   (g) an oil passage for delivering lubricating oil under pressure generated by said journal bearing to a location disposed at said interface between said surfaces.

28. A scroll machine as claimed in claim 27 wherein the loading of said journal bearing is such that it has an area of positive oil film pressure, said oil passage communicating with said journal bearing in the area of said positive oil film pressure.

29. A scroll machine as claimed in claim 28 wherein said oil passage communicates with said journal bearing in the area of said positive oil film pressure adjacent to but spaced from the point of maximum pressure.

30. A scroll machine as claimed in claim 29 wherein said oil passage communicates with said journal bearing at a point prior to the point of maximum pressure.

31. A scroll machine as claimed in claim 27 wherein said hydrostatic bearing means comprises a recess on one of said flat surfaces, said recess being in fluid communication with said location.

32. A scroll machine as claimed in claim 31 further comprising means defining a path of restricted flow between said location and said recess.

33. A scroll machine as claimed in claim 31 comprising a plurality of said recesses.

34. A scroll machine as claimed in claim 31 wherein said recesses are on said driving surface.

35. A scroll machine as claimed in claim 31 wherein said recesses are on said driven surface.

36. A scroll machine as claimed in claim 27 wherein said oil passage extends between the inner and outer peripheries of said drive bushing.

* * * * *

UNITED STATES PATENT AND TRADEMARK OFFICE
CERTIFICATE OF CORRECTION

PATENT NO. : 4,954,057

DATED : September 4, 1990

INVENTOR(S) : Jean-Luc Caillat et al

It is certified that error appears in the above-identified patent and that said Letters Patent is hereby corrected as shown below:

Column 1, line 22, delete "of".

Column 1, line 66, "inventions" should be -- invention --.

Column 2, line 36, "a" should be -- an --.

Column 5, line 46, "pessure" should be -- pressure --.

Column 5, line 60, "2" should be -- 3 --.

Column 6, line 13, "causeing" should be -- causing --.

Signed and Sealed this

Twelfth Day of January, 1993

*Attest:*

DOUGLAS B. COMER

*Attesting Officer*  *Acting Commissioner of Patents and Trademarks*